United States Patent [19]

Knudsen

[11] Patent Number: 5,199,498
[45] Date of Patent: Apr. 6, 1993

[54] CUSTOM HORSESHOE PAD AND HOOF REPAIR

[75] Inventor: Scott Knudsen, Grand Blanc, Mich.
[73] Assignee: Michael Diesso, E. Wareham, Mass.
[21] Appl. No.: 874,826
[22] Filed: Apr. 28, 1992
[51] Int. Cl.⁵ .......................... A01L 7/02; A01L 15/00
[52] U.S. Cl. .................................. 168/28; 168/12; 168/DIG. 1; 606/212
[58] Field of Search ................ 168/4, 12, 28, DIG. 1; 606/212

[56] References Cited

U.S. PATENT DOCUMENTS

| | | | |
|---|---|---|---|
| 3,118,449 | 1/1964 | Bane | 606/212 |
| 3,519,079 | 7/1970 | Bieber | 168/DIG. 1 X |
| 3,630,289 | 12/1971 | Norberg | 168/28 |
| 4,896,727 | 1/1990 | Busser | 168/4 |
| 5,011,407 | 4/1991 | Pelerin | 433/48 |
| 5,026,278 | 6/1991 | Osman et al. | 433/41 |
| 5,040,976 | 8/1991 | Ubel, III et al. | 433/41 |
| 5,066,231 | 11/1991 | Oxman et al. | 433/214 |
| 5,069,289 | 12/1991 | Schaffer | 168/4 |

OTHER PUBLICATIONS

Tone ®P-300 and P-700 High Molecular Weight Caprolactone Polymers (1988 Product Literature of Union Carbide Corporation).
Tony ®Polymer P-767 (1988 Product Literature of Union Carbide Corporation).

Primary Examiner—Robert P. Swiatek
Attorney, Agent, or Firm—Laff, Whitesel, Conte & Saret

[57] ABSTRACT

A hoof pad comprising a polymer composition containing at least about 50% by weight of high molecular weight polycaprolactone polymers wherein the composition has a melting point of from about 120° F. to about 200° F.

20 Claims, 3 Drawing Sheets

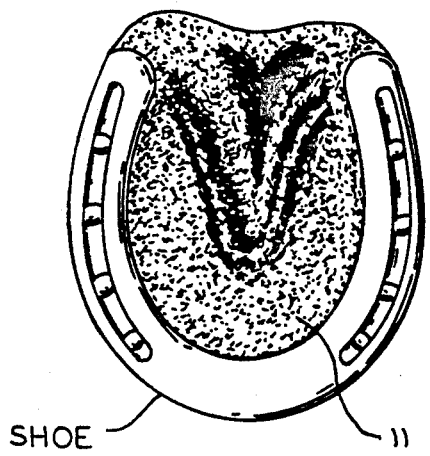
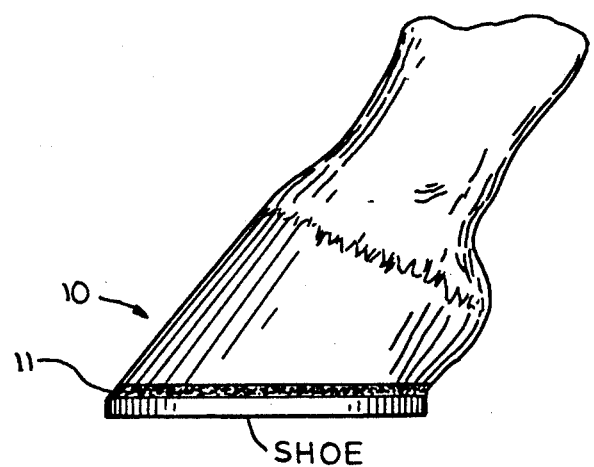
FIG.6  FIG.7
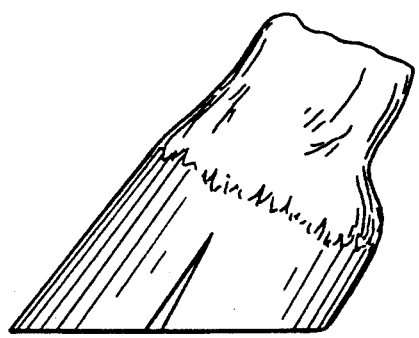
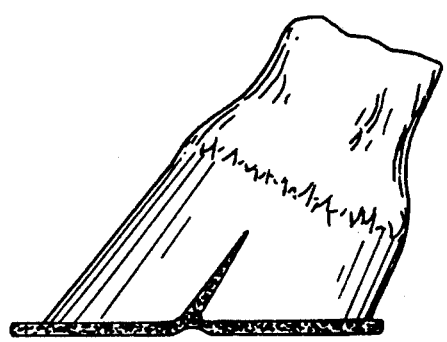
FIG.8  FIG.9
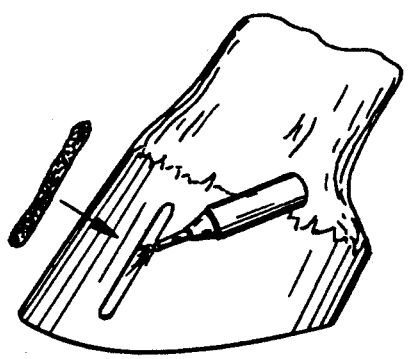
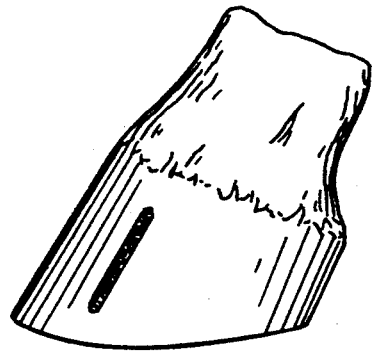
FIG.10  FIG.11

CUSTOM HORSESHOE PAD AND HOOF REPAIR

BACKGROUND OF THE INVENTION

The present invention relates to horseshoe pads, a method for preparing horseshoe pads, custom horseshoe pads, and a method of repairing and protecting animal hooves.

Horseshoe pads are used in conjunction with the usual and customary steel, aluminum or plastic horseshoes. A horseshoe is a ridged, abrasive resistant rim that is fastened with nails to the base of the outer wall of the animal's hoof. The purpose of this shoe is to protect and preserve the fragile ground border of the outer wall. Although, the horseshoe has proven its value and capabilities for the purpose intended, its protection is limited to the specific area known as the ground border of the outer wall.

Horseshoe pads ar generally used with horseshoes to expand the overall protection afforded by the standard horseshoe. The horseshoe pad covers areas of the hoof that are sensitive, vulnerable and prone to disease, damage, and injury. A horseshoe pad is a generally flat, non-formable sheet material of plastic, rubber, or leather that is placed broadly on the base of the hoof between the shoe and the hoof. This pad covers the entire base of the hoof but contacts only the ground border of the outer wall to which it is nailed in conjunction with the shoe. The pad covers the base of the hoof which consists of the bar, the sole, and the frog. The sole and frog are especially sensitive areas that are intended to be protected by the horseshoe pad.

In addition to protecting the hoof base, the pad also acts as a shock absorber of sorts because the pad is being made of a more resilient material than the tissues of the hoof. Although the pads generally protect the sole and frog from impact injury, the sole and frog remain vulnerable to environmental debris that enters through openings between the rise of the heel of the hoof and the flat non-conforming pad. This opening consists of grooves and channels that make up the frog. This debris consists of urine soaked manure, dirt, stones, wood shavings and such that tend to rot, decay and promote bacterial growth and injury to the sole and frog.

Attempts have been made to alleviate this problem by means of packing agents, such as felt, cotton, silicone, pine tar etc. These methods are time consuming, messy, and in many cases promote further problems. The normal horseshoe pads further offer limited protection to the outer wall of the hoof which is subject to chips, cracks, and fractures of normal ground impact and deterioration, due to the nailing application.

The flat horseshoe pads also greatly diminish the animal's traction and increase the tendency to slip and slide due to the pad's flat nature.

When a hoof is damaged by cracks, chips or deterioration a repair procedure consists of mixing various chemical agents such as epoxy or resins and application to the damaged hoof at the required areas. Other methods consist of wrapping the hoof with fiberglass impregnated taping. These methods are time consuming, messy and offer limited success.

Quarter hoof cracks are very common and tend to heal slowly. They are generally repaired by first cleaning the cracks to remove any harmful material, filling the cracks with an epoxy resin or the like, then suturing or bracing the crack with sheet metal and screws. These method require taking the horse out of its working for status, i.e. racing trail riding, etc. for a relatively long time.

Custom horseshoe pads ar virtually non-existent in everyday use.

The present invention provides a horseshoe pad which offers the farrier, trainer, owner or veterinary a custom horseshoe pad which can easily be conformed to suit the individual variations of hoof anatomy of the same or different animals and provide the animal with a pad that gives the animal a secure feel.

The method of preparing the custom horseshoe pads of the present invention and the custom horseshoe pads provide a time savings and expense savings for the farriers, trainers and veterinarians.

It is an object of the present invention to provide a custom pad and method of sealing the sole and frog in an intimate manner that allows the sole and frog to retain their anatomical shape and configuration for the purposes of maintaining the animal's grip traction and surefooted abilities, while protecting against impact injury from stones and rough terrain.

It is a further object of the present invention to provide a pad that may be applied in a custom formed, intimate manner that would form an individualized protective shield for the sole and frog and simultaneously correct and repair any chipped, cracked or deteriorated areas of an animal's hoof on the outer wall.

It is a further objective of the present invention to provide a method of custom forming an individualized hoof shield or pad that fully protects and seals the configurations of the individual animal's sole and frog by placing thermoplastic material in a container of non-reactive liquid, i.e. water which is at a temperature of about 140° F. to boiling; the thermoplastic material remains in the liquid until it forms a soft pliable mass of thermoplastic; the soft pliable thermoplastic mass is removed from the hot liquid; allowed to cool to a handling temperature, placed on the animal's hoof, manually working the soft pliable thermoplastic into all crevices, concavities, grooves and channels of the base of the hoof and having a portion overlapping the outer periphery of the hoof and securing in place with a standard and customary mechanical retention device, i.e. a horseshoe.

It is a still further object of the present invention to provide a method and a thermoplastic hoof repair material to repair chipped, cracked or damaged areas of the outer wall of an animal's hoof.

Still another object of the present invention is to use an organic thermoplastic material to prepare the custom animal hoof shield wherein the thermoplastic material contains at least about 75% weight of a polycaprolactone polyester of the formula

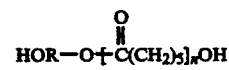

wherein R is an aliphatic group, and n is 300 to 650 and preferably the polyester has an average molecular weight of from about 35,000 to about 60,000 and a crystalline melting point of from about 120° F. to about 160° F.

Still another object of the present invention is to provide a polycaprolactone animal hoof pad or shield.

A still further object of the present invention is provide a polycaprolactone custom animal hoof shield or pad wherein the polycaprolactone has a formula

wherein R is an aliphatic group, and n is 300 to 650 and preferably has an average molecular weight of about 35,000 to abut 60,000 an a crystalline melting point of from about 120° F. to about 160° F. and preferably from about 130° F. to about 150° F.

SUMMARY OF THE INVENTION

The invention is directed to a one-piece plastic custom hoof pad and a method of preparing the custom plastic pad by the blacksmith or veterinary at the stables or field. The preferred method of preparing a custom pad is to place a flat high molecular weight polycaprolactone pad into a container of hot water having a temperature of at least 160° F. The polycaprolactone is preferably a mixture of polycaprolactones having an average molecular weight from about 35,000 to about, 45,000 and having a preferred melting temperature of from about 130° F. to about 150° F. The flat pad in the hot water until it forms a soft pliable pad. Then the soft pliable pad is removed from the hot water, cooled to handling temperature but still soft and pliable. The soft pliable pad is placed on a hoof and worked manually to conform to the frog, sole and outer wall of the hoof. The plastic is worked on the outside of the hoof upward from the ground border and worked into any damaged areas of the hoof ground border and outer wall. Then, a shoe is appropriately fastened over the pad to the hoof, i.e. by nailing. To allow the nails to easily penetrate the pad without cracking the pad, the pad is preferably rewarmed if necessary or the nails are warmed. The use of the pad in this manner further reduces any damage normally encountered when fastening a shoe on a hoof. The warm thermoplastic is allowed to cool to approximately room temperature—i.e. from about 5 to about 10 minutes. The custom pad is further cooled by placing the shoed hoof in cold water from about 30 second to about two minutes to form a hardened custom pad.

DESCRIPTION OF THE DRAWINGS

FIG. 6 is a bottom view of a horse's hoof with a custom pad and a horseshoe thereon;
FIG. 7 is a side view of the horse's hoof of FIG. 6.
FIG. 8 shows a hoof with a quarter crack.
FIG. 9 shows the quarter crack repaired with one embodiment of our invention.
FIG. 10 shows the quarter crack repaired with another embodiment of our invention.
FIG. 11 shows the quarter crack of FIG. 10, illustrating its appearance subsequent to repair.

DESCRIPTION OF THE PREFERRED EMBODIMENT

Figure 3:
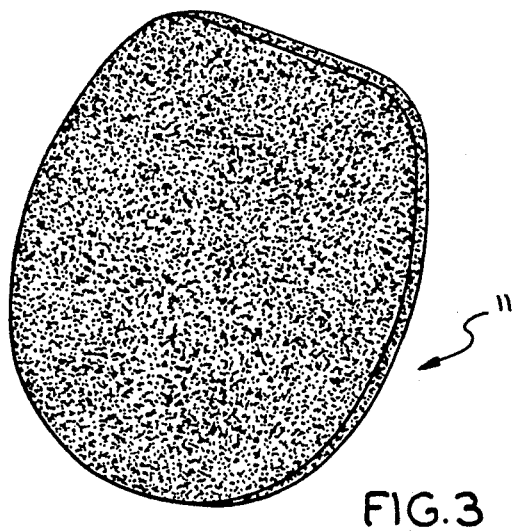
FIG. 3 is plastic relatively flat horseshoe pad.
Figure 3A:
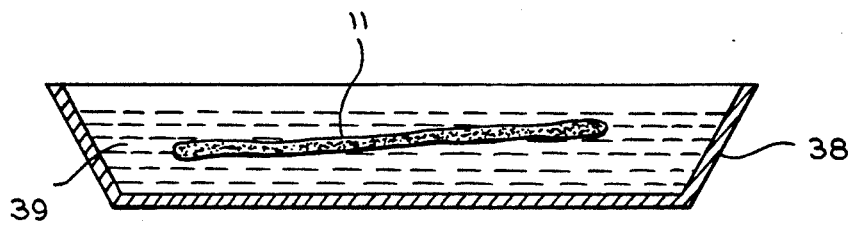
FIG. 3A is a cross-sectional view of the inventive horseshoe of FIG. 3, illustrating its placement in hot water for softening purposes.
Figure 4:
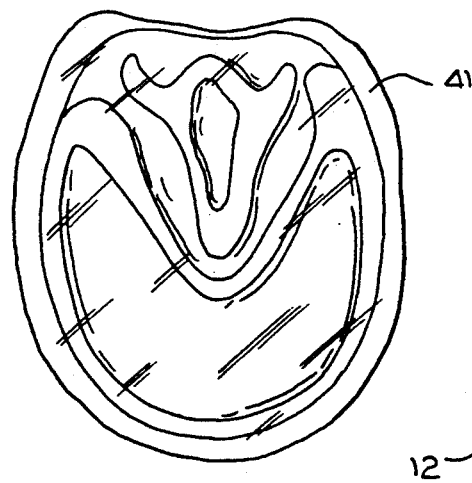
FIG. 4 is a bottom view of a horse's hoof having a custom pad thereon.
Figure 5:
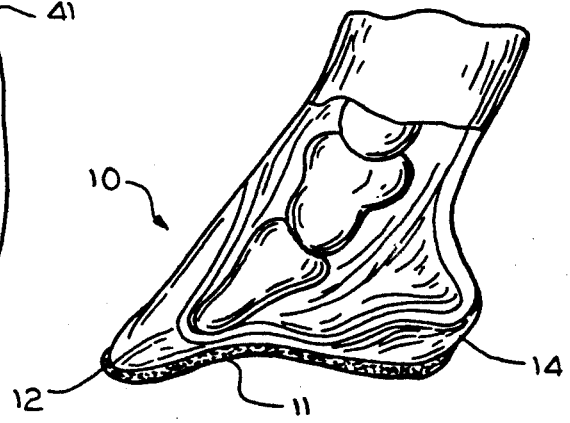
FIG. 5 is a side view of the hoof of FIG. 4.

A pre-custom hoof pad is preferably molded in a plurality of sizes and preferably has a flat generally oval shape which conforms generally to the outer circumference of a hoof. The pre-pad is shown in FIGS. 3 and 3A. The outer circumference of the pad is larger than the outer circumference of the hoof to permit the pad to be molded to a portion of the outer walls of the hoof if desired, and to also permit the pad to be used for several sizes of hoofs.

Figure 1:
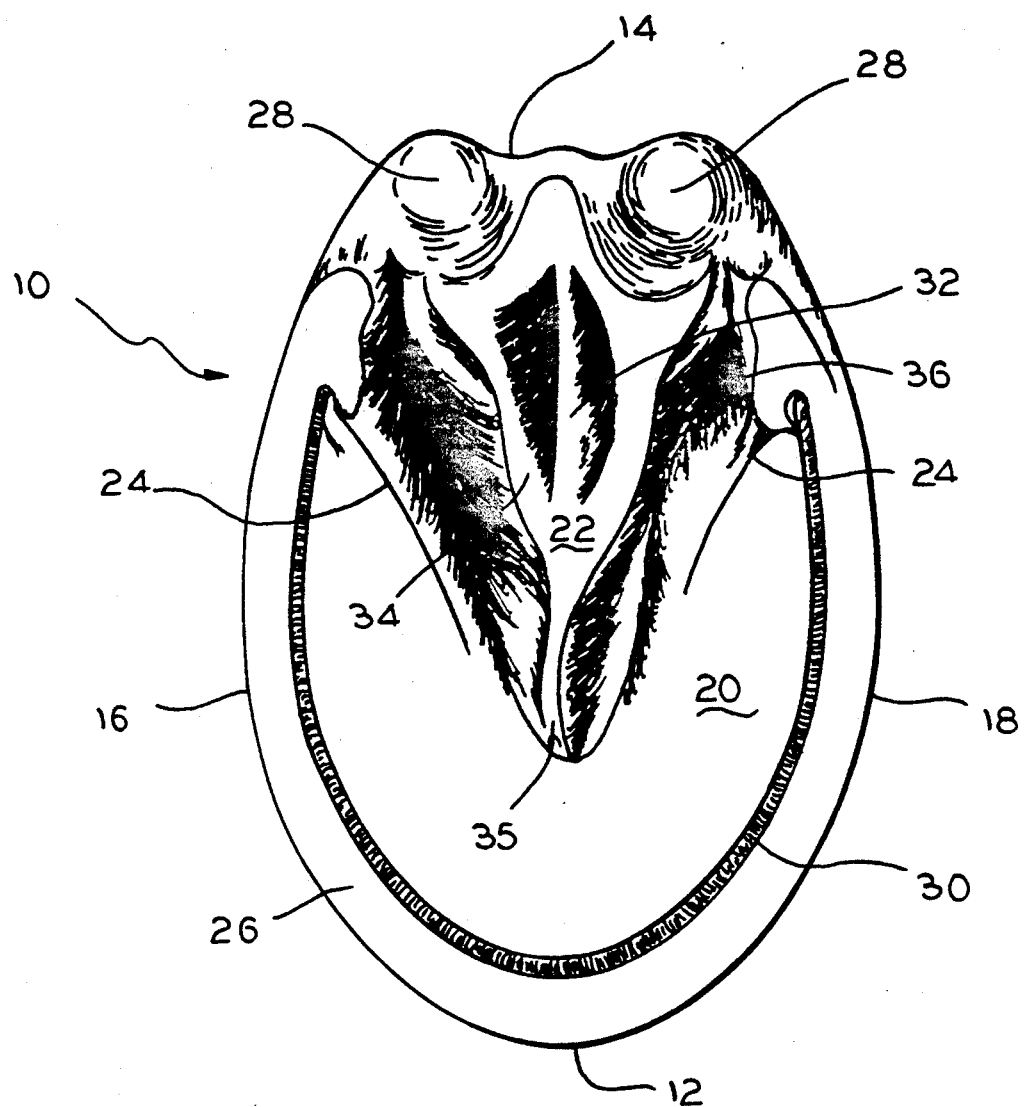
FIG. 1 is a bottom view of a horses hoof.

FIG. 1 illustrates a horse's hoof 10. The invention will be described relative to a horse's hoof but it is to be understood that the pad is applicable to any hoofed animal which needs to be treated with a hoof pad and especially a custom hoof pad.

Figure 2:
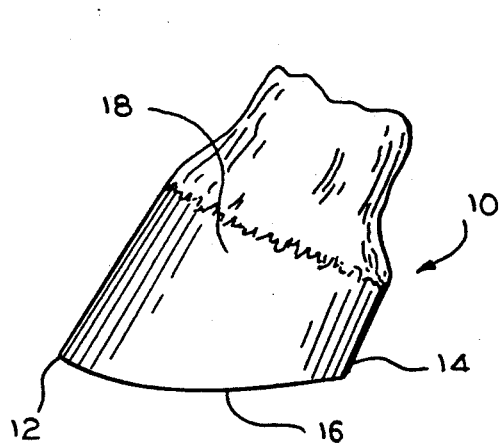
FIG. 2 is a side view of the hoof of FIG. 1.

Referring to FIGS. 1 and 2 there is illustrated the horse's hoof 10. The hoof has a toe section 12, a heel section 14, and a quarter side section 16 joining the heel and toe section. The hoof 10 is generally an irregular oval shape with the heel being concave rather than convex as is the toe. Hoof wall 18 grows uniformly from the coronary band. This makes the youngest portion of the wall at the heel. The rate of growth is generally slowed down by cold weather and accelerated by warmth.

The ground surface of the hoof as shown in FIG. 1 reveals the sole 20, the frog 22, bars 24 on each side of the frog, ground surface 26 of the hoof wall; heel bulbs 28 and white line 30. The white line is the junction formed by the periphery of the sole and the inner edge of the hoof wall. The white line delineates the relatively sensitive sole from the relatively nonsensitive hoof wall. Farriers use the white line as a guide for placing and driving horseshoe nails.

The frog 22 has a central sulcus 32, a ridge 34 surrounding the central sulcus and a collateral sulcus 36. The apex 35 of the frog is opposite the heel. All hoofs have the general configurations of FIGS. 1 and 2. However, as the farrier is well aware, each hoof is different. The sizes and shapes of the hoof wall, sole, frog, etc. vary from horse to horse as the fore foot and hind foot vary. Generally, the hind foot is more pointed than the forefoot. However, the two fore feet may vary from each other as may the two hind feet.

The pad 11 preferably used is a molded relatively flat high molecular weight polycaprolactone pad. The high molecular weight polycaprolactone is an essential ingredient for our hoof pad and repair composition. The hoof pad composition has from about 50% to 100% by weight high molecular weight polycaprolactone, from about 0% to about 50% by weight of an ethylene-vinyl acetate copolymer, about 0% to about 50% by weight a polyurethane polymer, and 0 to 5% of compatible additives. The hoof repair composition can also have from about 30% to about 50% by weight of low molecular weight polycaprolactone;

The composition has a melting point in the range of from about 120° F. to about 200° F.; holds its shape at room temperature to about 110° F.; is not brittle; has the following physical properties:

tensile modulus of at least 50,000 psi, a yield stress of at least 1400 psi, tensile strength of at least 3,000 psi at 2 in/min, % ultimate elongation at 2 in/min of at least 400 flexural stress at 5% strain of at least 2000 psi, notched izod impact strength ⅛ in. bar of at least 400 ft-lb/in of notch; a no break unmatched izod impact strength of ⅛ in bar, and a tensile impact strength of at least 50 ft-lb/in².

The high molecular weight polycaprolactone is known by the name tone P700 and/or or P767 purchased from Tak Systems in East Wareham, Mass. The high molecular weight polycaprolactone was indicated as being a homopolymer of caprolactone which is initiated with a diol. The polycaprolactone polymer used in the present invention was indicated as having the formula:

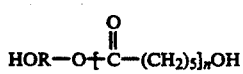

wherein R is an aliphatic hydrocarbon and n is 300 to 650.

The preferred average molecular weight of the polycaprolactone is from about 35,000 to about 60,000. The preferred caprolactone polymer is a mixture of 35 parts by volume of tone P-700 and 65 parts by volume of tone P-767.

Tone P-700 and P-767 are described as homopolymers of e-caprolactone. The polymerization is initiated by a diol (HO-ROH). The caprolactone is a seven-membered ring compound. P-767 has an average molecular weight of approximately 43,000 and is prepared from a special high purity grade of caprolactone monomer. Typical properties of P-767 are a tensile strength psi (MPa) of 3000–4500 (21.0 31.0); an elongation % of 600–1,000; and a melting point (by DSC), of 55°–65° C.

P-700 is semi-rigid at room temperature. The basic physical properties are shown in Table 1.

TABLE 1

| | |
|---|---|
| Tensile Modulus, psi (MPa) | 60,000 (414) |
| Yield Stress, psi (MPa) | 1,600 (11.0) |
| Tensile Strength, psi (MPa) | |
| 2 in/min | 4,500 (31.0) |
| 20 in/min | 4,000 (27.6) |
| Ultimate Elongation, % | |
| 2 in/min | 600 to 800 |
| 20 in/min | 600 to 800 |
| Flexural Modulus, psi (MPa) | 62,000 (428) |
| Flexural Stress at 5% Strain, psi (MPa) | 2,470 |
| Notched Izod Impact Strength, ⅛-in bar, ft-lb/in of notch (J/m) | 3 to 8 (160 to 425) |
| Unnotched Izod Impact Strength, ⅛-in bar | No Break |
| Tensile Impact Strength, ft-lb/in² (kJ/M²) | 60 (126) |
| Density, p, g/cc at | |
| 0° C. (32° F.) | 1.160 |
| 20° C. (68° F.) | 1.149 |
| 40° C. (104° F.) | 1.134 |
| 60° C. (140° F.) | 1.070 |
| 90° C. (194° F.) | 1.050 |
| (Delta)p/(Delta)T at −30° C. to 30 C, g/cc-°C. | −5.6 × 10⁻⁴ |
| (Delta)p/DeltaT at 60° C. to 100° C., g/cc-°C. | −6.8 × 10⁻⁴ |
| Moisture content | |
| at 50% Relative Humidity, % | 0.07 |
| at 100% Relative Humdity, % | 0.43 |

Thermal properties of P-700 are given in Table 2. The crystalline melting point is about 60° C. which is about 140° F.

TABLE 2

| | |
|---|---|
| $T_m$, Crystalline Melting Point[1], °C. (°F.) | 60 (140) |
| $T_g$, Amorphous, °C. (°F.) | −70 (−94) |
| $T_g$, Partially Crystalline, °C. (°F.) | −60 (−76) |
| Delta $H_f$, Heat of Fusion[1], two weeks at 23° C., cal/g | 18.5 |
| Delta $H_c$, Heat of Crystallization[2], cal/g | 14.6 |
| Delta $H_f$, Heat of Fusion[3], no annealing, cal/g | 14.7 |
| $T_c$[4], (cooling rate = 10° C./min), °C. | 20 |
| 20° C. | 108 |
| 30° C. | 167 |
| 40° C. | 900 |
| $T_c$[5], sec | |
| Specific Heat, Cal/9-°C. | |
| 20° C. (68° F.) | 0.473 |
| 40° C. (104° F.) | 0.659 |
| 80° C. (176° F.) | 0.533 |
| 100° C. (212° F.) | 0.545 |
| 150° C. (302° F.) | 0.555 |

[1]Crystalline melting point $T_m$, and DeltaH$_f$ were determined on a sample two weeks after compression molding.
[2]Heat of crystallization of molten sample cooled at 10° C./min.
[3]Heat of fusion determined on the sample directly after crystallization.
[4]Temperature of maximum crystallization rate after cooling at 10° C./min from above $T_m$.
[5]Samples were heated to 100° C., cooled at 160° C./min to designated temperature; time to reach maximum crystallization rate, $T_c$ was determined.

The low molecular weight polycaprolactone has about the same formula as the high molecular weight polycaprolactone except n is 5 to 150. The average molecular weight is from about 500 to about 15,000. A low average molecular weight polycaprolactone is tone P-300 which has the following physical properties as shown in Table 3.

TABLE 3

| | |
|---|---|
| Tensile Modulus, psi (MPa) | 60,000 (414) |
| Tensile Strength, psi (MPa) | 400–600 (2.76–4.14) |
| Ultimate Elongation, % | 0.8–1.2 |
| Melting Point, °C. (°F.) | 60 (140) |
| Density, p, at 23° C. (73° F.), g/cc | 1.14 |
| Brookfield Viscosity[1], at 204° C. (400° F.) | 500–2,500 |
| Melt Flow[2], 44 psi at 176° F. (0.3 MPa, 80° C.), dg/min | 500 |
| Instron Rheometer Test, Poise 80° C., 20 sec⁻¹ shear rate | 200–500 |

[1]Brookfield Model LVT Thermocel: Spindle SC4-34 (0.6 rpm)
[2]Procedure similar to ASTM D-1238

These and other objects are accomplished by a method of the preferred embodiment of the invention whereby a polycaprolactone polyester in the form of a flat sheet, patty, rods or pellets is heated to a deformable, easily moldable and adaptable form and custom contoured to the base of an animal's hoof. It is then finger pressed into all the concavities, irregularities and grooves of the sole and frog forming an intimate shield or barrier dam. Further this material is overlapped and pressed into any hoof cracks or damaged areas to form a repair patch or cast for the damaged hoof.

The hard pad is opaque. The opaque pad 11 is placed in a pan 38 of hot water 39 which has a temperature of at least about 140° F. The pad is allowed to remain in the water from about 30 seconds to about two minutes. When the pad turns translucent, the pad is removed from the pan of water by an appropriate tool and placed on the farrier's hand. The pad is cooled sufficiently so that it is warm to the human touch, but is still translucent and pliable. The pad is then placed on the base of the horse's hoof so that the periphery of the pad extends beyond the base periphery of the hoof.

Of course, prior to the above step of preparing the pliable pad, the horse's hoof is prepared for shoeing. Prior to placing the pad on the horse's hoof, the hoof is cleaned of all debris. The warm pliable pad is placed on the base of the horse's hoof and then manually worked.

The central portion of the pad is pushed in by the farrier's thumb and finger so that it conforms to the contours and crevices of the hoof, sole, frog, and so forth. The portion of the pad adjacent to the heel may be worked slightly above the heel ridge of the frog or may be just worked so that it is sure to be fit within the central sulces of the frog and onto the heel ridge of the frog. The shoe is now placed over the pad and nailed to the hoof in the usual manner. The pad is still sufficiently pliable so that the shoe nails easily penetrate the pad and the hoof in the normal manner.

As stated above, the pad aids in reducing and/or eliminating further cracks in the hoof wall which are normally encountered by the shoe nailing process.

After the shoe is nailed in place, the pad may be still further worked to be sure that it conforms to the hoof base and totally covers the hoof base so that debris and other harmful materials do not get under the pad. The outer portion of the pad is then trimmed to conform to the outer circumference of the hoof base including the outer circumference of the frog.

The pad is then allowed to further harden and cool to room temperature. However, in many instances, it is desirable to harden the pad in a more rapid manner. In that instance, the horse's hoof is placed in a pail of cold water for one to two minutes and the pad is then hardened. The procedure is carried out for both forefeet and both hind feet.

The pliable horseshoe pad can be manipulated so that it stretches if desired. In that instance, when there is a crack in the outer wall of the hoof or near the periphery of the hoof, the excess portion or overlap is pressed firmly into any areas that are chipped, cracked, damaged or missing and form a molding-type patch to form the simulated restoration of the compromised hoof.

If the damage is deep, then an appropriate glue is first placed into the crack before the soft polycaprolactone is pressed therein. The glue prevents the hardened polycaprolactone from accidentally being displaced from the crack.

The shoeing of the hoof takes place as the softened pad begins to turn opaque. This is the sign that the pad is beginning to harden. The shoe is then nailed in place. It is preferable to allow the softened pad to harden so that it has sufficient thickness to provide a cushion between the shoe and the hoof ground border.

After the shoe is nailed in place, the excess pad is trimmed, utilizing a sharp knife.

The form of the sole and frog should be fully evident with all anatomical and physiological contours and details prominently exposed. The appearance should be that of the normal sole and frog area, but appearing painted or as if coated with an opaque plastic sheathing. If the above appearance is not evident signifying an improper adaptation, then the farrier may use a heat gun to resoften the pad in place, wet the fingers and readapt where needed. The polycaprolactone pad underlaying the shoe should appear as uniform as possible so that it will serve as a shock absorber for the hoof wall. Any areas that have been repaired on the hoof outer wall should appear to be visibly filled with the polycaprolactone. At this stage, the outer wall is filed smooth in conformity with the shoe.

Similar results may be obtained by placing the hard opaque pad on the prepared (cleaned and ready for shoeing) hoof, placing a shoe thereover and nailing the shoe over the hard or slightly softened oval pad. The pad is then softened in place with a heat gun or heat lamp and pressed to conformity as set forth above.

At this point, the sole and frog area of the hoof is observed with the shielding in place to determine of a good adaptation has been obtained.

When repairing a quarter crack or similar crack in the outer wall of the hoof, this can be repaired by our pad composition or by the repair composition utilizing about 30 to about 50% by weight of the low molecular weight polycaprolactone. The addition of the low molecular weight polycaprolactone causes the repair composition to flow as a liquid when it is heated. In that instance, the quarter crack or crack is cleaned of all debris and harmful material. The surrounding area of the outer wall is also cleaned. An appropriate glue is placed on the internal walls of the crack, by squirting therein. It is not necessary to uniformly coat the crack with the glue in that only a small portion of glue is necessary to cause an adhesion between our repair composition and the hoof wall. Our repair composition, when hardened, conforms exactly to the contours of the crack and would generally exclude all air pockets. However, since our composition does not have a binding effect, glue is necessary to hold the composition to the walls of the hoof. However, since we have complete conformity, it is not necessary to have the glue totally surrounding the composition. In a preferred instance, the glue is placed in the crack as uniformly as possible.

The molding composition which has 50 to 100% high molecular weight polycaprolactone and preferably, at least 75% high molecular weight polycaprolactone, 0 to 50% by weight of a compatible polyurethane, and 0 to 50% by weight of an ethylene-vinyl acetate copolymer, and 0 to 15% by weight of compatible additives is placed in a heated non-solvent liquid, i.e., water, and softened. If the composition is in the form of an aggregate, the aggregate forms a soft pliable conglomerate or non-descript mass of thermal plastic. The soft pliable thermal plastic mass is removed from the hot water, pushed into the crack and then manually worked to thin out the plastic mass so that it conforms to the shape of the hoof surrounding the crack and does not protrude from the surface of the hoof in any manner. The thermal plastic is allowed to harden to form a hard hoof pad which is permanently adhered to the hoof and totally fills the crack. The softened material is smoothed out by appropriate sanding or filing to provide a smooth surface on the hoof. It has been found that this type of repair reduces the time to place the horse back into working condition.

Another manner of repairing a quarter crack or other cracks in the hoof is to utilize the repair composition which also contains 30 to 50% by weight of a low molecular weight polycaprolactone. In that instance, the low molecular weight polycaprolactone repair composition is in the form of an aggregate or a solid mass. The aggregate or solid mass is placed into an appropriate syringe-type device. The syringe-type device is heated and the low molecular weight polycaprolactone composition melts to form a flowing viscas type mass. This is unlike the molding-type mass of the high molecular weight polycaprolactone.

The liquid mass is then slowly injected into the crack of the hoof which has the glue already placed therein. As the liquid mass hardens, it is continuously pressed into the crack to be sure that the crack is completely filled with the low molecular weight polycaprolactone repair composition. The low molecular weight polycaprolactone composition hardens to a non-flowing mass in a relatively short period of time—30 seconds to two minutes and then is placed in cool water for about 30 second to two minutes to completely harden the mass. The repaired hoof is now complete.

We have utilized a hoof pad having 50% polyurethane and 50% of P767, a pad having 100% P767, a pad having 50% ethylene-vinyl acetate copolymer, a repair composition having 30% low molecular weight polycaprolactone P300 and 70% high molecular weight polycaprolactone P767 and a repair composition having 50% low molecular weight polycaprolactone P300 and 50% by weight high molecular weight polycaprolactone P767. All of these compositions perform satisfactorily for their intended purpose.

The preferred composition for the pad is one which has at least 75% by weight of high molecular weight polycaprolactone and no low molecular weight polycaprolactone.

I claim:

1. A hoof pad comprising a polymer composition containing at least about 50% by weight of high molecular weight polycaprolactone polymers wherein said composition has a melting point of from about 120° F. to about 200° F.

2. The pad of claim 1 wherein the polycaprolactone polymers have an average molecular weight of from about 35,000 to abut 60,000.

3. The pad of claim 2 wherein the polycaprolactone polymers have formula

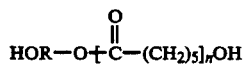

wherein R is an aliphatic group, and n is 300 to 650.

4. The hoof pad of claim 3 wherein the composition has at least about 75% by weight of the polycaprolactone polymers.

5. The hoof pad of claim 2 which consists of about 50 to 100% said polycaprolactone.

6. The hoof pad of claim 2 wherein the composition consists of:
about 50% to 100% of the high molecular weight polycaprolactone;
about 0% to 50% of polyurethane polymer;
about 0% to 50% of ethylene-vinyl acetate copolymer;
about 0% to 15% of additives.

7. The hoof pad of claim 1 wherein the polymer composition essentially consists of polycaprolactone polymers.

8. The hoof pad of claim 7 wherein the polycaprolactone polymers have an average molecular weight of from about 35,000 to about 60,000.

9. The hoof pad of claim 8 wherein the polycaprolactone polymers have the formula

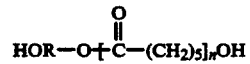

wherein R is an aliphatic group, and n is 300 to 650.

10. A custom hoof pad prepared from a polymer composition containing at least about 50% by weight of high molecular weight polycaprolactone polymers wherein said composition has melting point of from about 120° F. to about 200° F.

11. The custom pad of claim 10 wherein said polymer composition essentially consists of polycaprolactone polymers having an average molecular weight of from about 35,000 to about 60,000.

12. The custom hoof pad of claim 11 wherein the composition consists of about 50 to 100% said polycaprolactone.

13. The custom pad of claim 10 wherein the polycaprolactone polymers have the formula

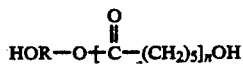

wherein R is an aliphatic group, and n is 300 to 650.

14. A method of preparing a custom hoof pad comprising:
forming said custom hoof pad from a polymeric composition which contains at least about 50% by weight of high molecular weight polycaprolactone polymers having a melting point of from about 120° F. to about 160° F. and which maintains its shape at room temperature and hoof sole temperature.

15. The method of claim 14 wherein the polycaprolactone polymers have an average molecular weight of from about 35,000 to about 60,000.

16. The method of claim 14 wherein the polymer composition essentially consists of polycaprolactone polymers of the formula

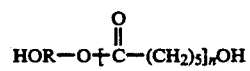

wherein R is an aliphatic hydrocarbon, and n is 300 to 650.

17. A method of preparing a custom hoof pad comprising:
preparing a hoof for shoeing;
heating a relatively flat polycaprolactone pad having a thickness of from about 0.05 to 0.25 inches in a non-solvent liquid to form a soft pliable pad, said non-solvent liquid being at a temperature of at least about 140° F., said polycaprolactone pad comprising at least about 50% by weight of high molecular polycaprolactone polymers and having melting point of from about 120° F. to about 200° F. and is hard at room temperature and at body temperatures, said polycaprolactone polymers have an average molecular weight of from about 35,000 to bout 60,000;
removing said soft pliable pad from said non-solvent liquid;
placing said soft pliable pad at the bottom of said hoof so that a portion of the pad extends beyond the circumference of said hoof;
manually working said soft pliable pad to contact the sole, bar, central frog groove, frog ridge, frog lateral groove, bending the soft overhang to contact hoof heel, cooling said workable soft pad on said hoof to form thereon a custom pad;
cooling and shoeing said hoof over said custom pad; and
trimming said custom pad to provide a hard custom pad under said shoe.

18. The method of claim 17 wherein the polymer composition essentially consists of polycaprolactone polymers of the formula HOR—O[C—(CH2O5]$_n$OH wherein R is an aliphatic group, and n is 300 to 650.

19. The method of claim 18 wherein the non-solvent liquid is water and said aggregate is heated in hot water from about 30 seconds to about two minutes, said soft mass is worked into a soft form which is placed on the hoof base, manually working the soft form on the base of the hoof to cover the entire base and conform to the contours of said hoof base, manually working the overhand portion to form a patch to cover any damages in the outer walls of the hoof adjacent said base and to cover a portion of said heel; and cooling the custom pad with cold water for at least one minute and said cold water having a temperature of from 40° F. to 60° F.

20. A plastic hoof pad comprising:
a polymer composition having a melting point of about 120° F. to 200° F. and the following physical properties:
tensile modulus of at least 50,000 psi, a yield stress of at least 1400 psi, tensile strength of at least 3,000 psi at 2 in/min, % ultimate elongation at 2 in/min of at least 400 flexural stress at 5% strain of at least 2000 psi, notched izod impact strength ⅛ in. bar of at least 400 ft-lb/in of notch; a no break unmatched izod impact strength of ⅛ in bar, and a tensile impact strength of at least 50 ft-lb/in$^2$.

* * * * *